United States Patent [19]

Strang, Sr. et al.

[11] Patent Number: 5,029,879
[45] Date of Patent: Jul. 9, 1991

[54] SEAL FOR PIPE TO WALL JUNCTIONS

[75] Inventors: Robert E. Strang, Sr., North Liberty; Robert E. Strang, Jr., Lakeville, both of Ind.

[73] Assignee: Injection Plastics Manufacturing Company, Inc., Lapaz, Ind.

[21] Appl. No.: 490,496

[22] Filed: Feb. 28, 1990

Related U.S. Application Data

[63] Continuation of Ser. No. 235,482, Aug. 24, 1988, abandoned.

[51] Int. Cl.[5] .............................................. F16J 15/10
[52] U.S. Cl. ............................. 277/178; 277/207 A; 285/113
[58] Field of Search ............... 277/4, 137, 189, 207 A, 277/208, 212 C, 212 F, 178; 285/80, 98, 110, 112, 113, 158, 921

[56] References Cited

U.S. PATENT DOCUMENTS

| | | | |
|---|---|---|---|
| 2,695,801 | 11/1954 | Kosatka | 277/212 |
| 2,721,749 | 10/1955 | Crow | 277/212 |
| 3,033,624 | 5/1962 | Biesecker | 285/921 |
| 3,065,004 | 11/1962 | Laich | 285/921 |
| 3,076,668 | 2/1963 | Famely | 16/2 |
| 3,109,662 | 11/1963 | Bergstrom | 277/206 |
| 3,119,624 | 1/1964 | Freed | 277/208 |
| 3,199,879 | 8/1965 | Fleming | 277/212 |
| 3,243,206 | 3/1966 | Samer | 16/2 |
| 3,344,829 | 10/1967 | Ripple | 277/212 |
| 3,829,184 | 8/1974 | Chevret | 16/2 |
| 3,958,817 | 5/1976 | Marsh, Jr. | 285/113 X |
| 4,059,289 | 11/1977 | Morris et al. | 277/180 |
| 4,302,035 | 11/1981 | Ochwat | 285/158 |
| 4,397,061 | 8/1983 | Kanzaka | 16/2 |

FOREIGN PATENT DOCUMENTS

| | | | |
|---|---|---|---|
| 1675374 | 12/1970 | Fed. Rep. of Germany | 403/288 |
| 2557667 | 7/1985 | France | 285/113 |
| 2103732 | 2/1983 | United Kingdom | 277/207 A |

Primary Examiner—William A. Cuchlinski, Jr.
Assistant Examiner—Scott Cummings
Attorney, Agent, or Firm—James D. Hall

[57] ABSTRACT

An improved seal at the junction of a pipe or tube to an opening formed in a flat wall or in the wall of a cylindrical or rounded container, including axially tapered exterior and interior peripheral surfaces. The tapers of such surfaces being different one from the other and being of such a degree that, when the seal is inserted into the opening in the receiving member and the pipe is inserted therethrough, the material from which such seal is fabricated is forced to bulge around the periphery of the opening, thereby securing the pipe in the opening and perfecting the seal therebetween.

8 Claims, 2 Drawing Sheets

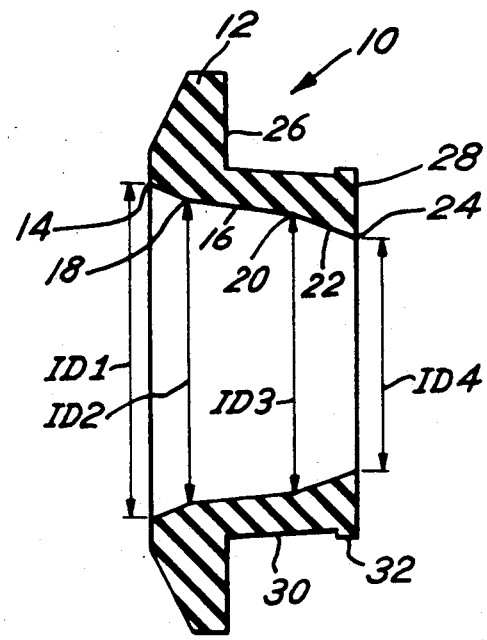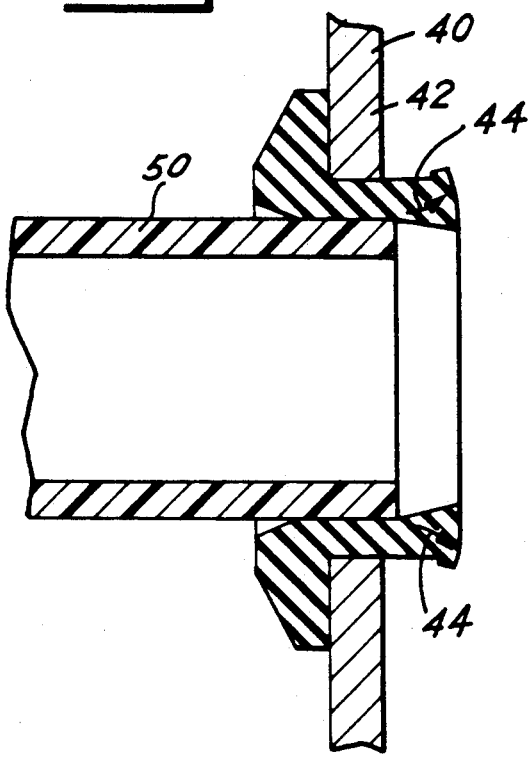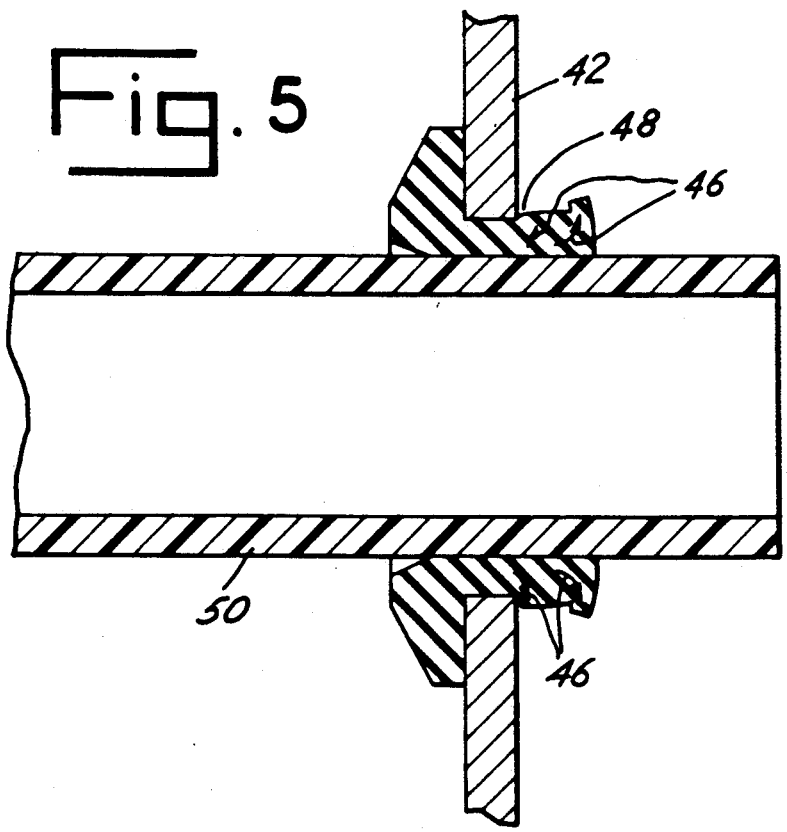

SEAL FOR PIPE TO WALL JUNCTIONS

This is a continuation of co-pending application Ser. No. 235,482 filed on Aug. 24, 1988, now abandoned.

FIELD OF THE INVENTION

This invention relates generally to a pipe seal or gasket and particularly to a seal which encircles a pipe inserted into a wall of another pipe of larger diameter or the wall of a container, the seal or gasket being compressed between the pipe and the wall to ensure leakproof assembly.

BACKGROUND OF THE INVENTION

It has long been a desire to develop a simple seal which obviates the need for the application of additional materials, such as cements or caulking, to prevent the seepage of fluid at points where pipes extend into container walls or into walls of pipes of larger diameter. Such a need has become greater with the development of synthetic materials from which piping or tubing is manufactured.

Such materials are economic to make and are easy to work with, but have created vastly different sealing and seepage-prevention problems. Efforts have been made in the past to overcome the seepage problems.

SUMMARY OF THE INVENTION

The present invention overcomes the prior shortcomings by the provision of a seal, or gasket, with varying degrees of thicknesses in that portion of the seal which is inserted and positioned between the piping and the wall into which the pipe is inserted. Due to this structure, the gasket of this invention stretches and expands around the edges to be sealed, thereby perfecting the seal and ensuring against leakage.

An additional advantage of this seal is that such structure creates a much stronger seal, thereby preventing loosening of the seal and acting to make removal of the pipe more difficult.

A further advantage of this seal is that such a structure creates a much tighter seal than heretofore possible, thereby preventing wobble or vibration and subsequent loosening of the seal.

BRIEF DESCRIPTION OF THE DRAWINGS

Further characteristics and advantages of the invention will become more readily apparent from the following detailed description of a preferred embodiment of the invention, illustrated by way of example in the accompanying drawings in which:

FIG. 3 is a vertical cross-sectional view taken along line 3—3 of FIG. 1;

FIG. 4 is a vertical cross-section view taken along line 5—5 of FIG. 2, but illustrating a pipe partially inserted into the seal of this invention; and FIG. 5 is a vertical cross-sectional view similar to that shown in FIG. 4, illustrating the distortion of the seal when it is assembled in a wall with a pipe fully inserted and extending therethrough.

DESCRIPTION OF THE PREFERRED EMBODIMENT

Figure 1:
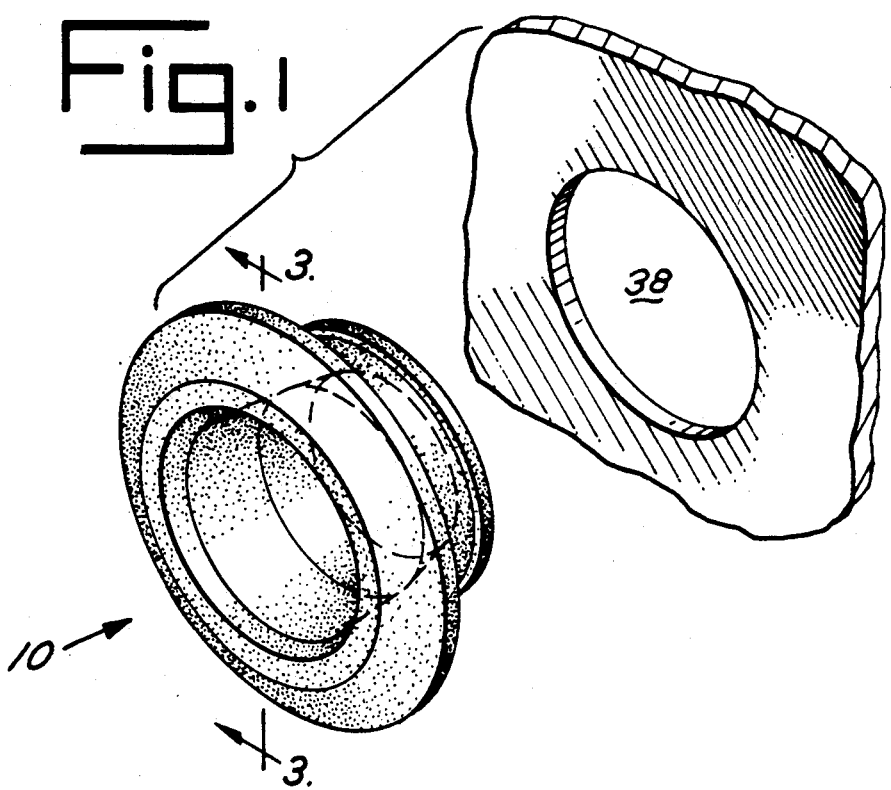
FIG. 1 is a perspective view of a pipe seal embodying the present invention and positioned adjacent a wall opening into which it will be inserted.

The present invention is illustrated and will be described as applied to an opening in and insertion into a flat wall configuration, but it has been applied in practice to the side wall of a pipe of larger diameter or to a container having a cylindrical or arcuate side wall configuration, and it will be understood that it works equally well in each of these environments. Accordingly, the illustrations are not intended to be, nor should they be construed to be, a limitation on the invention.

The seal of this invention is generally referred to by the numeral 10. As best illustrated in FIG. 3, it will be observed that the interior and exterior peripheral circumferences of the seal are of varying diameters. Outer lip portion 12 of seal 10 is of a larger diameter, preventing the seal from being pushed completely through wall 40 when the pipe is inserted, and is a standard configuration for seals of this nature.

It should also be understood that a complete line of seals of a variety of diameters, made to accommodate the variety of diameters in piping, can be provided and nothing herein should be construed as a size limitation.

The initial peripheral diameter ID-1 at throat 14 of seal 10 which is encountered by the pipe when the seal is entered (from the left in the illustrations) is somewhat in excess of the diameter of pipe 50, merely to facilitate insertion. The interior diameter of seal 10 is tapered inwardly in distinct sections, each taper being of a different and distinct angle. The outermost peripheral interior diameter ID-2 at throat portion 18 of middle taper 16 approximates the diameter of a pipe to which seal 10 is mated. The axial length of middle taper 16 should exceed the thickness of wall 40. Indeed, the distance from the plane of face 26 of outer lip 12 to the furthermost end 20 of middle taper 16 should be equal to or be slightly in excess of the thickness of wall 40. The rearmost taper 22 of seal 10 is further constricted from interior peripheral diameter ID-3 to the rearmost interior peripheral diameter ID-4. The angle of taper 22 is about 11 degrees.

In testing it has been determined that merely forming the interior periphery of a seal to be of a diameter less than that of the inserted pipe will not achieve the desired result. Although a single taper from the outermost radial interior periphery to the innermost radial interior periphery may be satisfactory in some applications, the sharper rearmost taper 22 has been found to more effectively achieve the desired seal.

It has also been determined that the thickness of the seal may be varied within reason to accommodate different diameter pipes inserted into the same diameter holes without departing from the invention. The critical feature is the relative taper of peripheral exterior 30 and tapers 16 and 22 rather than the thickness of the walls of seal 10.

In other words, by way of further explanation and for exemplary purposes only, there may be a need to insert both a ¾ inch pipe and a one inch pipe into a single container or wall. The holes to receive each pipe may be drilled on site to a diameter of 1¼ inches. One of the seals may have an outermost peripheral interior diameter ID-2 at throat portion 18 of ¾ inches and another seal may have an outermost peripheral interior diameter ID-2 at throat portion 18 of one inch. The outer peripheral diameter of both seals, at lip face 26, will be the diameter of the hole, that is, 1¼ inches. The result is that at lip 26, the thickness of wall 34 of seal 10, in the first instance, will be approximately ¼ inch, while in the second instance it will be approximately ⅛ inch. The point being that the thickness of the wall of the seal, within reason, is not so critical as is the differential in the relative tapers of the exterior and interior walls in the axial direction. If, however, the wall is too thick, the effectiveness of the seal will be lost because the compression will be internally absorbed.

The peripheral exterior 30 of seal 10, from face 26 of lip portion 12 to the rearmost edge 28 of seal 10, is slightly axially tapered. At the base of 26 the outer peripheral diameter approximates or very slightly exceeds, but preferably should not be less than the diameter of opening 38 of wall 40.

At the rearmost edge 28 of seal 10, there is a flange or lip 32 which has an external peripheral diameter in excess of the diameter of hole 38. This is merely a safety feature which serves to prevent inadvertent dislodging of seal 10 between the time that it is inserted into hole 38 and the time that pipe 50 is extended therethrough.

It has been determined that the axial taper of outer periphery 30 of seal 10 should be less than the axial taper along the interior periphery of the middle taper 16. Ideally, the preferred degree of taper of outer periphery 30 will be one-half the degree of taper of the inner periphery. More precisely, the preferred degree of taper for inner and outer peripheries will be 6 degrees and 3 degrees respectively.

Seal 10 is fabricated of any resilient material commonly used for the intended purpose. Normally, such a seal is molded of a semi-elastic, semi-plastic rubber-like composition which possesses a certain degree of rigidity, but which is stretchable and pliable.

Figure 2:
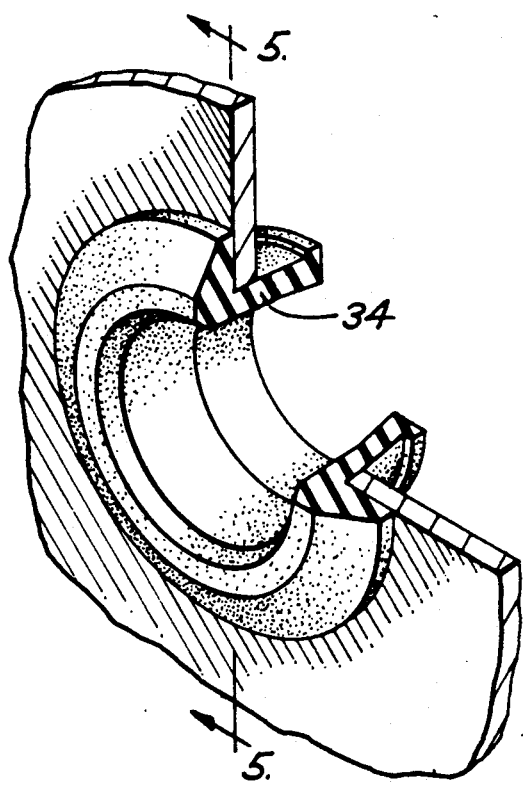
FIG. 2 is a perspective view, in partial section, of the pipe seal positioned within the wall opening.

In operation, as illustrated in FIGS. 1 and 2, wall 40 is provided with hole 38 of a desired diameter to snugly receive seal 10. Seal 10 is then inserted into hole 38 of wall 40, face 26 of lip portion 12 abutting the face of wall 40. It will be understood that the hole 38 is generally drilled on site and that the resulting edge is not of the accuracy and fineness which is obtained from a sophisticated machine operation. Such an edge, or the cut, contains imperfections and it is one of the benefits and objectives of this invention to overcome and to seal such imperfections.

Referring to FIG. 4, it will be seen that pipe 50 has been partially inserted through seal 10 and into wall 40. More specifically, the end of pipe 50 has reached the furthermost end 20 of middle taper 16. Due to this taper, that part of the seal along the peripheral exterior 30 is axially stretched in a rearward direction, as shown by arrows 44 in FIG. 4, and forced outwardly into a snug contact with the inner diameter of hole 38. In application, any slight imperfections in the cut or a slightly off-round configuration is filled with the material of which seal 10 is composed.

As pipe 50 is inserted farther into and through seal 10, rearmost taper 22, with its excess of material, comes into play. This tapered material functions in two distinct ways. It will be recalled that the thickness of the wall of seal 10 at the rearmost portion 20 (ID-3) of middle taper 16 is greater than the thickness of the seal wall at face 26.

As pipe 50 is inserted beyond middle taper 16, generally corresponding to inner edge 42 of wall 40, the material is stretched and forced rearwardly and outwardly, as depicted by arrows 46 in FIG. 5, to actually form a lip 48 around the entire inner periphery of hole 38 in wall 40. The material is squeezed to such an extent that it bulges into and around hole 38. Thus, the seal is perfected.

Due to the thickness of the rearmost wall of seal 10 relative to its thickness adjacent face 26, rearmost portion 28 is stretched rearwardly and outwardly as it is mushroomed against inner edge 42 of wall 40. As a result, pipe 50 is tightly grasped by seal 10, to such an extent that pipe 50 cannot easily be removed from wall 40. Further, this prevents the pipe from wobbling and ensures that it will not become loosened due to vibrations or the like.

While the preferred embodiment of this invention has been illustrated and described, it will be understood that changes in the structure may be made within the scope of the appended claims without departing from the spirit of the invention.

What is claimed is:

1. An improved seal for securing the junction between a pipe having an outer diameter and a walled receiving member having an opening therein, said seal being of a resilient material and of a ring-like form having inner and outer peripheries and foremost and rearmost end parts, said seal inner periphery having a radially inwardly tapered end portion at the rearmost end part of the seal, said seal including lip means at said foremost end part for abutting said receiving member at the innermost face of said lip means, said seal outer periphery at the plane of said lip means innermost face having a diameter approximating the diameter of said opening in the receiving member, said seal inner periphery extending forwardly of said lip means innermost face plane having a diameter at least approximating the outer diameter of said pipe, the improvement wherein:

said seal inner periphery having a radially inwardly tapered middle portion extending in an axial direction from a plane of said lip means innermost face to said inwardly tapered end portion and constituting means providing for the stretching of said seal along said tapered middle portion in the direction of movement of said pipe during insertion of the pipe into the tapered middle portion from said seal foremost end with the seal positioned in said receiving member opening, said seal outer periphery having a radially inwardly tapered portion extending in an axial direction from said lip means innermost face plane toward said rearmost end part of the seal and constituting means providing for the stretching of said seal along said tapered middle portion during insertion of said pipe into the tapered middle portion of the seal, said tapered end portion having a diameter less than the diameter of said pipe in constituting means when expanded by the pipe for overlapping said receiving member.

2. The seal of claim 1 and an external flange at the rearmost end part of the seal.

3. The seal of claim 2 wherein said external flange is of a diameter slightly greater than the diameter of said receiving member opening.

4. The seal of claim 1 wherein said seal outer periphery tapered portion is tapered at an angle which is one half of the angle of taper of said seal inner periphery tapered middle portion.

5. The seal of claim 4 wherein said seal outer periphery tapered portion is tapered at approximately 3° and said seal inner periphery tapered middle portion is tapered at approximately 6°.

6. The seal of claim 5 wherein the angle of taper of said seal outer periphery tapered portion is approximately 11 degrees.

7. The seal of claim 1 wherein said seal inner periphery tapered middle portion has a length at least equal to the thickness of the receiving member at said opening therein.

8. The seal of claim 7 wherein said seal inner periphery includes a radially inwardly tapered portion between the outermost face of said lip means and said tapered middle portion, the minimum diameter of said last mentioned tapered portion exceeding the diameter of said pipe.

* * * * *